United States Patent Office 3,518,311
Patented June 30, 1970

3,518,311
TERTIARY PHOSPHINE SULFIDES AND PROCESS FOR PREPARING
Ludwig Maier, Zurich, Switzerland, assignor to Monsanto Company, St. Louis, Mo., a corporation of Delaware
No Drawing. Filed Apr. 5, 1965, Ser. No. 445,793
Int. Cl. C07d *105/02*
U.S. Cl. 260—606.5
3 Claims

ABSTRACT OF THE DISCLOSURE

Tertiary-phosphine sulfides depictable by the formula $R^1R^2R^3(PS)$ wherein $R^1$ and $R^2$ are alkyl having from 1 to 2 atoms and $R^3$ is alkyl having from 8 to 18 carbon atoms. These compounds find utility as heat transferring liquids and lubricant additives.

---

The invention relates to process for preparing tertiary phosphine sulfides of the formula general

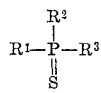

wherein $R^1$ and $R^2$ are substituted or unsubstituted alkyls having 1 to 18 carbon atoms, alkenyls having 2 to 18 carbon atoms, cycloalkyls or cycloalkenyls having 5 to 12 carbon atoms, aralkyls, alkaryls, heterocycloalkyls, $R^2$ moreover can also be a group $—P(S)(R^1)R^4$ or $—R^5—P(S)(R^1)R^4(R^4$—hydrogen $R^2$, $R^3$ or $R^5$=alkylene having 1 to 6 carbon atoms or phenylene) and $R^3$ is a substituted or unsubstituted, straight or branched chain alkyl having 2 to 18 carbon atoms, an alkenyl having 3 to 18 carbon atoms, a cycloalkyl or cycloalkenyl having 5 to 12 carbon atoms, an aralkyl having an alkyl portion of at least 2 carbon atoms or, together with a radical $R^2$, the latter not being on the same phosphorus atom, an alkylene having 2 to 9 carbon atoms. $R^1$ and $R^2$ can also be taken together with the phosphorus atom to which they are attached to form a heterocycloalkyl having from 2 to 9 carbon atoms. In general it is preferred that the R groups, which can be hydrocarbon or substituted hydrocarbon, contain not more than 18 carbon atoms.

The addition of primary or secondary phosphine oxides to α-olefins (vinyl compounds) in an electrophilic or nucleophilic reaction is well known. (British Pat. No. 923,532, Dec. 30, 1960.) However, the same reactions cannot be carried out with, for example, primary phosphine sulfides.

It is further known that secondary phosphine sulfides can undergo base catalyzed nucleophilic additions to aldehydes and ketones [Peters, J. Org. Chem. 27, 2198 (1962)]. It is stated in this publication that the addition of secondary phosphine sulfides to isocyanates and activated olefins, such as acrylonitrile, which is catalyzed by strong bases, have also been shortly investigated. The additions to acrylonitrile carried out frequently are, in general, initiated either by a cation or an electron deficient complex, or by a basic catalyst, depending on the kind of the second reactant. In the last case, a strong base, such as triethylamine, pentamethylguanidine, alkali alcoholate or sodium hydroxide has been used. It is a general rule that electron-attracting groups like the cyano group promote the nucleophilic addition. When the double bond is connected to such a group, the π- electrons are more strongly fixed and by this an attack of the anions will be possible. The β-carbon atom of the double bond in acrylonitrile is easily accessible because of the cyano group to the addition of anions and other strongly nucleophilic agents. Thus, reactions can occur which would not have taken place with a non-influenced double bond.

No practical examples in this respect are found in the cited reference, but the statement: "Although infrared analysis indicated that addition had occurred, the products were difficult to purify and could not be satisfactorily characterized." About the structure of the compounds apparently obtained as a mixture only, nothing can be said from this.

Owing to this prior art one had to assume that secondary phosphine sulfides cannot be added to non-activated α-olefins.

Now it has been found that secondary phosphine sulfides add also to non-activated olefins when the reaction is carried out in the presence of a radical builder, i.e. a free-radical-forming catalyst which does not act as a desulfidizer against the participant of reaction. Moreover, the addition to olefins having non-terminal double bond and to alicyclic olefins is also possible. Therefore, the invention is not limited to the preparation of tertiary phosphine sulfides in which has been introduced as a last group an ethyl group or substituted ethyl group only.

In addition of a secondary phosphine sulfide to an olefin proceeds according to the scheme:

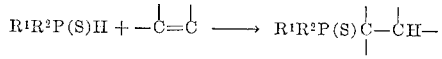

In these formulae $R^1$ and $R^2$ have the significance as before and the group

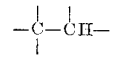

having the valencies occupied represents in the end product the radical $R^3$ defined in the beginning.

Among the numerous well-known secondary phosphine sulfides fitting the reaction of invention are found as simplest representatives dialkyl-, dicycloalkyl, diaryl-, diaralkyl-, dialkarylphosphinesulfides, analogs possessing a combination of different, possibly unsaturated hydrocarbon radicals and heterocyclically substituted secondary phosphine sulfides, thereby the phosphorus can also be a part of a heterocyclic ring system, such as in the compounds tetramethylenephosphine sulfide, pentamethylenephosphine sulfide, etc.; however, if high yields of a single product are desired normally it will be preferred that the R groups be free of aliphatic (acetylenic or olefinic) unsaturation to avoid possible side reactions of phosphines with aliphatic unsaturation with another phosphine.

The enumerated hydrocarbon radicals can contain substituents, limited to those that do not disturb or hinder the reaction. The substituents can be:

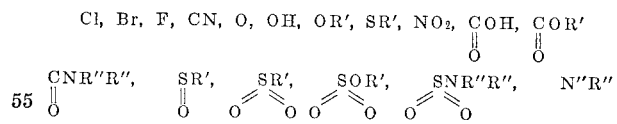

($R'$=radical completing the ether or ester group; $R''$= hydrogen or radical completing the amide group).

As substituents in the starting products moreover can be found further secondary phosphine groupings, such as $—P(S)(R^1)H$ and $—R^5—P(S)(R^1)H$, since diphosphines of the formula general

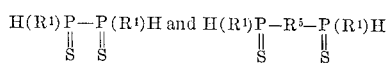

wherein $R^1$ has the significance as before and $R^5$ is an alkylene having 1 to 6 carbon atoms or phenylene, can be brought to reaction in a similar manner with 1 or 2 moles of an olefin.

Any available olefin can be used as second reactant. Examples are straight and branched chain aliphatic olefins having up to about 18 carbon atoms, such as ethylene, propylene, butene-1, butene-2, isobutene, 2,4,4-trimethylpentene-1, pentene-2, hexene-1, hexene-2, hexene-3, octene-2, octene-4, decene-5 etc.; alicylic olefins having up to about 12 carbon atoms, such as cyclopntene, cyclohexene, cycloheptene, cyclooctene, α-pinene, β-pinene, camphene etc.; and araliphatic olefins, such as styrene, allylbenzene, diphenylethylene, etc. Valuable products are also obtained with manifold unsaturated olefins. These can be non-conjugated like allene, 1,1-dimethylallene, diallyl, dimethallyl, squalene, 4-vinylcyclohexene, cyclooctadiene-1,5, cyclododecatriene-1,5,9, γ-terpinene, limonene, divinylbenzene, etc., or conjugated like bitadiene, 2,4-diphenylbutadiene-1,3, isoprene, piperylene, 2,3-dimethylbutadiene-1,3, 2-ethylbutadiene-1,3, 4-methylpentadiene-1,3, 1-phenylpentadiene-2,4, hexadiene-1,3, hexatriene-1,3,5, octadiene-1,3, octadiene-3,5, octatriene-1,3,5, cyclopentadiene, cyclohexadiene-1,3, 1-vinylcyclohexene, dimethylfulvene, diphenylfulvene, α-terpinene, etc.

The substituents occurring in the first reactants, i.e. in the secondary phosphine sulfides can generally also be found in the second reactants, i.e. in the olefins, thereby the electronegative groups may be located either on the double bond or remote from it and the groups OH, $NH_2$, NHR″R″ only remote from it. Among the numerous compounds of this class will be cited herein some simple aliphatic representatives, such as vinylchloride, vinylbromide, acrylonitrile, acrylic esters, acrylamides, alkyl- and alkenevinyl ether, -vinylsulfides, -vinylsulfones, -vinylsulfoxides, -vinylketones, nitroethylene, vinylsulfonic esters, vinylsulfonic amides, allylalcohol, allylamine, etc.

On practicing the reaction a secondary phosphine sulfide is heated together with an olefin in the presence of a free-radical-forming catalyst. Any catalyst in liquid phase is suitable at usual temperatures (0–200° C.) if its covalent C—C, N—N, O—O, S—S etc. bond possesses a dissociation energy of about 10 to 40 kcal. Examples are azocompounds, diazocompounds, peroxides, hydroperoxides, nitrosocompounds, hydrazines, azides, disulfides, hydrocarbons, organometallic compounds etc. Examples are 2,2′-azodiisobutyronitrile, dimethylaminodiazobenzene, di-tert-butylperoxide, cumolhydroperoxide, nitrosoacetanilide, tetraphenylhydrazine, benzenesulfonylazide, diphenylsulfide, diphenyl-tetra-p-biphenylylethane, tetracyclohexyllead, dibenzylmercury etc.; furthermore short wave radiation such as ultraviolet light radiation, X-, α-, β-, and γ-radiation, neutron radiation; ultra sound; etc.

The catalyst substances initiating the radicals are employed in amounts of about 0.5 to 10 mole percent based on the secondary phosphine sulfide.

The reaction can be carried out with or without a solvent. Suitable solvents are paraffins, cycloparaffins, aromatic hydrocarbons, halogenated, hydrocarbons, nitriles and ethers, such as pentane, hexane, heptane, cyclohexane, benzene, toluene, xylene, tetrahydronaphthalene, decahydronaphthalene, methylenedichloride, o-dichlorobenzene, chlorinated naphthalene, acetonitrile, adiponitrile, diethylether, dioxane, dimethoxyethane. Water and oxygen are preferably excluded from the reaction mixture, except that controlled amounts of oxygen can be the free-radical-forming catalyst for the reaction. In the reaction of gaseous olefins, such as ethylene, propylene, butene-1, butene-2, isobutene, butadiene, it is advantageous to work in an autoclave at a pressure of up to 500 atmospheres.

The most favorable reaction temperature conforms with the decomposition temperature of the free-radical-forming substances. It is to be determined in each case by preliminary experiments. It lies at about 50° to 110° C. with, for example, diacyl peroxides, such as dibenzoyl peroxide, lauroyl peroxide, bis(2,4-dichlorobenzoyl)peroxide, bis(p-chlorobenzoyl)peroxide, bis(m-nitrobenzoyl) peroxide, diacetyl peroxide, etc.; at about 20° to 100° C. with di-n-alkyl peroxides, such as dimethyl peroxide, diethyl peroxide, methyl-ethyl peroxide, etc.; at about 50° to 130° C. with di-sec-alkyl peroxides, such as di-isopropyl peroxide, di-sec-amyl peroxide, etc.; at about 100° to 200° C. with di-tert-alkkyl peroxides and hydroperoxides, such as di-tert-butyl peroxide, di-tert-butylhydroperoxide, di-tert-amyl peroxide, di-α,α-dimethylbenzyl peroxide (α-cumylperoxide), di-α,α-dimethylbenzyl hydroperoxide (α-cumyl-hydroperoxide); at about 120° to 150° C. with ketone hydro-peroxides, such as hexanone hydroperoxide. The convenient reaction temperature, of course, also depends on the kind of the solvent and of the reactants. In similar manner the decomposition temperature, or the radical formation respectively, of the other cited catalysts is also directed by their constitution. The radiation with α- and β-particles, or with X- and γ-rays, can be generally conducted at lower temperatures than the radiation with ultraviolet light. The reaction temperatures sutiable herein lie in the range of about −20° to 200° C. Activated olefins can generally be brought to reaction at ambient temperature.

In general, the reactants are used in equimolar amounts in the reaction with single unsaturated olefins. Because of practical considerations also an excess of the secondary phosphine sulfide or olefin sometimes may be used.

In order to avoid the polymeriztaion of the olefin to be reacted, it is expedient to add these in the presence of the radical builder (free-radical-forming catalyst) to the secondary phosphine sulfide. With olefins, such as acrylonitrile, acrylates, styrene, etc., being very susceptible to polymerization initiated by radicals, it is convenient to catalyze the addition by radiation with ultraviolet light. It was surprising and not obvious that the addition now proceeds faster than the polymerization and that by contrast to the base promoted catalysis defined products are formed which can be isolated.

Simple tertiary phosphine sulfides are known to a great number. The well-known compounds of the formula $R_3PS$, wherein R signifies an unsubstituted alkyl, are partly liquid, e.g. R=n-propyl (B.P. 112° C./1.1 mm.), n-butyl (B.P. 111° C./0.1 mm.), and n-amyl (B.P. 165–167° C./0.9 mm.), or solid, e.g. R=methyl (M.P. 155–156° C.), ethyl (M.P. 94° C., isobutyl M.P. 59–60° C.) and iso-amyl (M.P. 95.5–96.5° C.). The sole compound of the formula $R_2R'PS$ wherein the Rs signify unsubstituted alkyls, namely R-ethyl, R′-methyl, which has been known till now, also is solid (MP. 66° C.).

Because of their good thermal stability the tertiary phosphine sulfide having a long chain in branched alkyl group are especially suitable as heat transferring liquids, lubricant additives and so on, provided they remain liquid at as low a temperature as possible.

It has been found that tertiary phosphine sulfides conforming with this requirement possess the general formula $R_2'PS$, wherein R signifies lower aliphatic alkyls having 2 to 4 carbon atoms and R′ a long chain unbranched alkyl having 8 to 12 carbon atoms. These compounds have been found in the course of a systematic investigation. It was surprising and not at all obvious that tertiary phosphine sulfides having greater alkyls in a certain combination with low alkyls can be liquid like diethyl-n-dodecylphosphine sulfide (B.P. 155°–165° C./0.2 mm.), di-iso-butyl-n-dodecylphosphine sulfide (B.P. 150°–160° C.) and diethyl-n-octylphosphine sulfide (B.P. 126–130° C./0.2 mm.), since an analogous compound having totally just as many carbon atoms in the molecule like dimethyl-n-tetradecylphosphine sulfide (M.P. 55–56° C.) is not liquid. This class of valuable temperature resistant liquid tertiary phosphine sulfides having a relatively high boiling point are obtained according to the instant process by addition of certain secondary phosphine sulfides to octene-1, nonene-1, decene-1, undecene-1, and dodecene-1, i.e. to straight chain-olefins having 8 to 12 carbon atoms.

Tertiary bis(phosphine sulfides) of the formula

are well known. Such compounds have been obtained by reaction of organic thiophosphonic dichlorides $R^1P(S)Cl_2$ with Grignard compound. According to this well known method there cannot be obtained bis(phosphine sulfides), but only simple tertiary phosphine sulfides by using long chain Grignard compounds, such as alkyl-MgBr having 8 to 20 carbon atoms in the alkyl. By reaction of secondary bis(phosphine sulfides) with long chain olefins like dodecene, now these compounds can also be prepared:

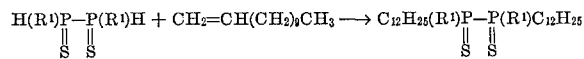

In similar manner can be obtained alkylene- and arylene-bis(phosphine sulfides) of the formula

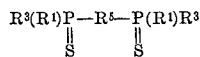

In this formula $R^5$ stands for an alkylene having 1 to 6 carbon atoms or a phenylene.

The secondary bis(phosphine sulfides) can be prepared in a relatively simple manner according to a copending patent application of the same inventor and same patentee conform to the scheme:

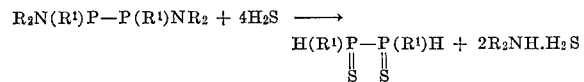

In the reaction of a secondary bis(phosphine sulfide) and a diolefin one obtains according to the kind of reactants or steric occurrences respectively, novel cyclic or polymeric products, which can be expressed by the following formulae:

In these formulae $R^1$ to $R^5$ are defined as before and $p$ has the value of 1 to 4000. If $p$ possesses the value of 1 it concerns a cyclic product, thereby $R^3$ is a possibly substituted polymethylene chain having 2 to 9 methylene units. If the steric condition of ring formation are not favorable, in general, polymeric products having up to about 4000 of the units formulated above are obtained.

The molecular weight optionally can be varied in usual manner by addition of chain terminating agents, e.g. by an increased amount of the radical builder, single secondary phosphine sulfides, monoolefins or any other monofunctional compound reacting with either the phosphine sulfide or olefin. By addition of polyfunctional phosphines, e.g. primary phosphine oxides and/or polyenes, cross-linked products are formed.

It is understood that in the reaction of dienes and polyenes the secondary phosphine sulfide may be added also to only one of the ethylenic bonds present.

All tertiary phosphine sulfides can be converted into the corresponding oxides by ways which are known.

EXAMPLE 1

3.3 (0.035 mole) of $(CH_3)_2P(S)H$ and 7.2 g. (0.036 mole) of tetradecene-1 are heated with 0.4 g. (0.003 mole) of 2,2′-azodiisobutyronitrile to 75° C. and then kept at 85–90° C. for 4 hours. Upon fractional distillation one obtains 10.2 g. (100%) $(CH_3)_2C_{14}H_{29}PS$ or $(CH_3)_2(n-C_{14}H_{29})PS$; B.P. 186–190° C./0.2 mm., M.P. 55–56° C.

*Analysis.*—Calc'd for $C_{16}H_{35}PS$ (percent): C, 66.15; H, 12.15; S, 11.04. Found (percent): C, 66.45; H, 11.70; S, 11.64.

The sulfides can be converted into the oxides. A solution of 5 g. (0.017 mole) of $(CH_3)_2(n-C_{14}H_{29})PS$ in 30 ml. of acetone is treated with an excess $H_2O_2$ (30%) and refluxed for 2 hours. Thereby sulfur precipitates. This is filtered off, the filtrate concentrated, treated with 5 ml. of KOH (20%) and extracted three times with 20 ml. of benzene each. After distilling the benzene one obtains 4.7 g. (100%) of $(CH_3)_2(n-C_{14}H_{29})PO$; M.P. 84–86° C., $P^{31}$ chem. shift (in benzene) −37.2 p.p.m.

*Analysis.*—Calc'd for $C_{16}H_{35}OP$ (percent): C, 70.02; H, 12.86. Found (percent): C, 69.62; H, 12.03.

From 10 g. (0.034 mole) of $(C_2H_5)_2(n-C_{12}H_{25})PS$, 50 ml. of acetone and 5 ml. of $H_2O_2$ (30%) as above are obtained 8.2 g. (86.3%) of $(C_2H_5)_2(n-C_{12}H_{25})PO$; B.P. 170–172° C./0.2 mm., M.P. 47–49° C., $P^{31}$ chem. shift (in methyl alcohol) −56.1 p.p.m.

In siminar manner are prepared the following compounds:

$R^1R^2R^3PS$

| Compound No. | $R^1, R^2$ | $R^3$ | Kp. | Fp. (deg.) | $n_D^{20}$ | Yield, percent |
|---|---|---|---|---|---|---|
| 1 | $C_2H_5$ | $n-C_2H_{17}$ | 126–130°/0.2 |  | 1.5028 | 83.2 |
| 2 | $C_6H_5$ | $n-C_6H_{13}$ |  | 53.54 |  | 60.9 |
| 3 | $C_6H_5$ | $n-C_{12}H_{25}$ | 218–220°/0.2 | 42–43 |  | 83.0 |
| 4 | $C_2H_5$ | $n-C_{12}H_{25}$ | 155–165°/0.2 |  | 1.4971 | 95.2 |
| 5 | $CH_3$ | $n-C_{14}H_{29}$ | 186–190°/0.2 | 55–56 |  | 100 |
| 6 | $i-C_4H_9$ | $n-C_{12}H_{25}$ | 150–160°/0.2 |  | 1.4882 | +88.6 |
| 7 | $C_6H_5$ | $Cyclo-C_6H_{11}$ |  | 180–185 |  | 77 |

The elemental analysis of some of the products of the previous table are set forth in the following table:

| Compound No. | Calc'd, percent ||| Found, percent |||
|---|---|---|---|---|---|---|
|  | C | H | S | C | H | S |
| 1 |  |  | 13.7 |  |  | 14.1 |
| 2 | 71.5 | 7.7 | 10.6 | 71.3 | 7.5 | 10.6 |
| 3 | 74.6 | 9.1 | 8.3 | 75.0 | 9.4 | 9.1 |
| 4 |  |  | 11.0 |  |  | 11.6 |
| 6 | 69.3 | 12.6 | 9.2 | 69.7 | 11.7 | 9.7 |

EXAMPLE 2

5.6 g. (0.02 mole) of

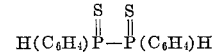

and 4 g. (0.021 mole) of tetradecene-1 are heated with 0.4 g. of 2,2′-azodiisobutyronitrile at 80–100° C. for 4 hours. On cooling the reaction mixture crystallizes. Yield 8.5 g. (88.5%); M.P. 57–58° C.

Upon fractional crystallization in alcohol it is possible to separate the racemate and the meso form from one another. One streomer (more difficulty soluble in alcohol) melts at 45–49° C.

EXAMPLE 3

4 g. (0.0183 mole) of $(C_6H_5)_2P(S)H$ and 1 g. (0.0189 mole) of $CH_2=CHCN$ are subjected to ultraviolet radiation with stirring for 3–4 hours. After 1–2 hours the diphenylphosphine sulfide goes into solution and the mixture becomes liquid. After totally 3–4 hours the mixture crystallizes.

Yield 4.9 g. (100%); recrystallized in light petroleum the cyanoethyl-diphenylphosphine sulfide melts at 119–124° C.

*Analysis.*—Calc'd for $C_{15}H_{14}NSP$ (percent): C, 66.40; H, 5.20; N, 5.16; S, 11.81. Found (percent): C, 66.42; H, 5.34; N, 5.74; S, 11.22.

EXAMPLE 4

4.36 g. (0.02 mole) of $(C_6H_5)_2P(S)H$ and 1.24 g. (0.021 mole) of allyl alcohol are heated with 0.1 g. of 2,2′-azodiisobutyronitrile in 5 ml. of toluene as in Example 1. After distilling the toluene the residue crystallizes. It is recrystallized in acetone-hexane and gives 4.8 g. (87.3%) 3-hydroxypropyl-diphenylphosphine sulfide; M.P. 105–107° C., $P^{31}$ chem. shift (in acetone) −42.4 p.p.m.

*Analysis.*—Calc'd for $C_{15}H_{17}OSP$ (percent): C, 65.19; H, 6.20. Found (percent): C, 65.78; H, 6.08.

What is claimed is:

1. Tertiary phosphine sulfides of the formula $R^1R^2R^3PS$ wherein $R^1$ and $R^2$ are alkyl having from 1 to 4 carbon atoms, and $R^3$ is alkyl having from 8 to 18 carbon atoms.

2. Liquid tertiary phosphine sulfides of the formula $R^1R^2R^3PS$ wherein $R^1$ and $R^2$ are alkyl having from 2 to 4 carbon atoms, and $R^3$ is alkyl having from 8 to 12 carbon atoms.

3. A phosphine sulfide of claim 1 wherein $R^1$ and $R^2$ are each methyl, and $R^3$ is n-tetradecyl.

References Cited

UNITED STATES PATENTS

| | | | |
|---|---|---|---|
| 2,957,931 | 10/1960 | Hamilton et al. | 260—606.5 X |
| 3,082,256 | 3/1963 | Harwood et al. | 260—606.5 |
| 3,304,330 | 2/1967 | Yoke et al. | 260—606.5 |

FOREIGN PATENTS 923,532  4/1963  Great Britain.

OTHER REFERENCES

Peters: Journal of Organic Chemistry, vol. 27, p. 2199 (1960).

Goldsmith: Chemical Abstracts, vol. 57 (1962), pp. 2245–6.

TOBIAS E. LEVOW, Primary Examiner

W. F. W. BELLAMY, Assistant Examiner

U.S. Cl. X.R.

252—49.8

Page 1

UNITED STATES PATENT OFFICE
CERTIFICATE OF CORRECTION

Patent No. 3,518,311　　　　Dated June 30, 1970

Inventor(s) Ludwig Maier

It is certified that error appears in the above-identified patent and that said Letters Patent are hereby corrected as shown below:

Column 1, line 13, "$R^1R^2R^3(PS)$" should be -- $R^1R^2R^3P(S)$ --.

Column 2, line 22, "In addition" should be -- The addition --.

Column 2, line 25, at the end of the equation preceding the arrow insert a dash after C Column 2, line 54, at the end of the line " N"R" " should be -- $NR'' R''$ --.

Column 3, line 5, "cyclopntene," should be -- cyclopentene --.

Column 3, line 13, "bitadiene," should be -- butadiene --.

Column 3, line 53, "halogenated, hydrocarbons," should be -- halogenated hydrocarbons, --.

Column 4, line 24, "polymeriztaion" should be -- polymerization --.

Column 4, line 47, "in branched" should be -- unbranched --.

Column 4, line 53, "$R_2'PS$," should be -- $R_2R'PS$ --.

Column 6, line 20, "siminar" should be -- similar --.

Column 6, the first table, in the column "$R^3$" the first compound "$n-C_2H_{17}$" should be -- $n-C_8H_{17}$ --.

Column 6, the first table, in the column "Yield, percent" the second percentage "60.9" should be -- 60.0 --.

con't

UNITED STATES PATENT OFFICE
CERTIFICATE OF CORRECTION

Patent No. 3,518,311  Dated June 30, 1970

Inventor(s) Ludwig Maier

It is certified that error appears in the above-identified patent and that said Letters Patent are hereby corrected as shown below:

Column 6, line 46, the portion of this chemical equation that shows "$(C_6H_4)$" should be -- $(C_6H_5)$ -- in both places.

Column 6, line 53 and 54, please omit the last sentence and insert the following -- One stereomer (more difficulty soluble in alcohol) melts at 59-61°C and the other stereomer (better soluble in alcohol) melts at 45-49°C. --.

Signed and sealed this 14th day of September 1971.

(SEAL)
Attest:

EDWARD M. FLETCHER, JR.
Attesting Officer

ROBERT GOTTSCHLAK
Acting Commissioner of Patents